(12) United States Patent
Henriksson et al.

(10) Patent No.: US 7,295,732 B2
(45) Date of Patent: Nov. 13, 2007

(54) WAVELENGTH SELECTIVE DEVICE

(75) Inventors: Anders Henriksson, Hässelby (SE); Fredrik Jonsson, Stockholm (SE); Staffan Karlsson, Uppsala (SE); Ulf Olin, Enskede (SE)

(73) Assignee: Proximion Fiber Systems AB, Kista (SE)

( * ) Notice: Subject to any disclaimer, the term of this patent is extended or adjusted under 35 U.S.C. 154(b) by 0 days.

(21) Appl. No.: 10/581,252

(22) PCT Filed: Nov. 30, 2004

(86) PCT No.: PCT/SE2004/001774
§ 371 (c)(1),
(2), (4) Date: Oct. 19, 2006

(87) PCT Pub. No.: WO2005/054918
PCT Pub. Date: Jun. 16, 2005

(65) Prior Publication Data
US 2007/0104421 A1    May 10, 2007

Related U.S. Application Data

(60) Provisional application No. 60/481,726, filed on Dec. 1, 2003.

(30) Foreign Application Priority Data
Dec. 1, 2003    (SE) .................................... 0303223

(51) Int. Cl.
*G02B 6/26* (2006.01)
(52) U.S. Cl. ............................ 385/50; 385/28; 385/30; 385/37

(58) Field of Classification Search ............ 385/27–30, 385/33, 37, 24, 49, 50, 126; 372/97, 99, 372/6, 102
See application file for complete search history.

(56) References Cited

U.S. PATENT DOCUMENTS 7,062,131 B2 * 6/2006 Ilchenko ...................... 385/50
2004/0131312 A1 * 7/2004 Ohlander et al. ............. 385/37

FOREIGN PATENT DOCUMENTS

| WO | WO-00/29886 A1 | 5/2000 |
| WO | WO-02/06878 A | 1/2002 |
| WO | WO-02/096878 A1 | 12/2002 |

* cited by examiner

*Primary Examiner*—Hemang Sanghavi
(74) *Attorney, Agent, or Firm*—Birch, Stewart, Kolasch & Birch, LLP

(57) ABSTRACT

The present invention relates to a device, method, array and use of the device for optical coupling. The device comprises first and second optical waveguides (13, 23) extending longitudinally with cores (14, 24) adapted to guide optical radiation (15), first resonator means, laterally surrounding the first waveguide, comprising first and second resonator members (18, 19), and second resonator means, laterally surrounding the second waveguide, comprising third and fourth resonator members (28, 29). The invention is characterized in that first and second deflector means (16, 26) are adapted to couple radiation propagating in the respectiv first and second waveguides with common radiation modes (30), which modes are defined by adjustable geometrical and material properties of the device, so as to obtain wavelength selective coupling of radiation guided by the first and second waveguides, provided the resonator means are tuned to the same resonance wavelength.

24 Claims, 10 Drawing Sheets

WAVELENGTH SELECTIVE DEVICE

This application is the National Phase of PCT application PCT/SE2004/001774, filed Nov. 30, 2004 and claims priority under 35 U.S.C. 119(e) on U.S. Provisional Application Nos. 60/481,726 filed on Dec. 1, 2003 and under 35 U.S.C. 119(a) on Patent Application No(s). 0303223-2 filed in Sweden on Dec. 1, 2003, all of which are hereby incorporated by reference.

TECHNICAL FIELD OF THE INVENTION

The present invention relates to a wavelength selective optical coupling device and corresponding method, use and array, all of them particularly useful in communication networks utilising fiber optic wavelength division multiplexing.

BACKGROUND OF THE INVENTION

Wavelength selective optical coupling devices according to related art for optical add/drop multiplexing are used to extract a single wavelength or several wavelengths from a broadband optical signal, or to add a single wavelength to a broadband optical signal. Such devices are typically used in fiber optic networks utilising wavelength-division multiplexing, to add or drop wavelength channels to/from an optical fiber.

Most optical add/drop multiplexers used today are fixed. That is, the wavelength to be added or dropped is determined by device design and cannot be changed after the device has been manufactured. To allow for more dynamic and flexible planning of the traffic in the optical networks, reconfigurable optical add/drop multiplexers are being developed. With these devices it is possible to change the wavelength channel to be added or dropped also after the device has been installed in the network. Thus, the network can more efficiently be controlled in terms of traffic provisioning and protection switching.

A common implementation of reconfigurable optical add/drop multiplexers is to use a demultiplexer to split up the incoming broadband light signal into separate waveguides for each wavelength channel. With 2-by-2 crossbar switches on each channel waveguide, it is possible to select which wavelengths to be added/dropped. After the switches, a multiplexer is used to recombine all wavelengths channels into a common output waveguide. This kind of reconfigurable optical add/drop multiplexer is described in the review article "The wavelength add/drop multiplexer for lightwave communication networks"Bell Labs Technical Journal, January-March 1999, p. 207-209 by C.R. Giles and M. Spector.

A drawback associated with the solution above is that the multiplexers are expensive and have large transmission loss. Thus, an alternative solution, without the (de-)multiplexers, is the broadcast-and-select solution. This implementation is discussed in the paper "Broadcast-and-select OADM enables low-cost transparency", Light-wave, December 2001 by J. Bayne and M. Sharma. In this implementation a coupler is used to tap off a part of the optical power from all channels. The tapped broadband signal is directed towards one or more narrow band channel filters. These channel filters select the wavelengths that shall be dropped from the network. The optical signal that was not tapped off by the coupler is directed towards a wavelength blocker that attenuates the wavelengths channels that were dropped by the channel filters. Thus, after the wavelength blocker, new information can be added to the dropped wavelength channels.

Some common disadvantages with both the solutions above are that many different components are required to implement the add/drop functionality. Thus, the optical add/drop device becomes expensive. Furthermore, with all the different components the light must pass, there will be substantial optical loss. This loss must be compensated for by optical amplifiers, which further increase the cost for the implementation.

Simpler optical add/drop solutions can be implemented using fiber Bragg gratings and circulators. Here the incoming broadband signal is coupled from port 1 of the circulator to its port 2, where a fiber Bragg grating is reflecting one or more wavelength channels. The reflected channels are now entering port 2 of the circulator and are dropped in its port 3. To add new information to the dropped channels, a second circulator is used. Signals that are to be added enter a second circulator and exit from there towards the fiber Bragg grating, where the selected wavelength channels to be added are reflected. The added wavelength channels then pass through the second circulator. The wavelength channels that are not reflected by the fiber Bragg grating, pass straight through the first circulator, the fiber Bragg grating and the second circulator. The implementation of this kind of optical add/drop multiplexer is also discussed in the previously mentioned review article by Giles and Spector, to which reference is made.

By means of the solution above, some complexity and thereby cost can be reduced. However, the circulators incur loss on the express traffic, i.e. the traffic that is not added or dropped, and thus only a few optical add/drop multiplexers can be added to a fiber network before optical amplifiers have to be added.

A solution directed towards coupling out a selected wavelength channel from a wavelength-division multiplexed broadband signal is disclosed in U.S. Pat. No. 4,466,694. Wavelengths that are not to be coupled out from a waveguide are meant to pass a described device with negligible loss. A disadvantage associated with the suggested implementation, however, is that light is only coupled out from the waveguide to radiation modes. Thus, the device will function merely as a wavelength-selective attenuator, but not for optical add/drop multiplexing, where light should be coupled between waveguides.

The ideas described above are further discussed in U.S. Pat. No. 6,501,879, in which two different implementations are described of how a wavelength-selective coupler according to that disclosed in U.S. Pat. No. 4,466,694 can be used for optical add/drop multiplexing. In a first example, the wavelength-selective coupler is used together with circulators, in a similar manner as the fiber Bragg grating is used in the example above. A disadvantage of this solution is that the wavelength selective coupler only reflects light, when light is coupled out orthogonally from the waveguide in to the surrounding external resonator. Thus, to be able to tune this device, the grating period in the waveguide has to be changed simultaneously with the surrounding optical resonator.

In the second optical add/drop multiplexer implementation according to U.S. Pat. No. 6,501,879, two wavelength-selective couplers are used in series to retro-reflect the wavelength channel to be dropped. However, the same disadvantage remains in this implementation as in the previously mentioned implementation, namely that the waveguide grating has to be tuned to couple the selected light orthogonally out from the waveguide and in to the external resonator.

Based on the above, a solution to the mentioned problems in association with related art is desirable.

SUMMARY OF THE INVENTION

It is therefore an object of the present invention to alleviate the previously mentioned shortcomings of related art. This is accomplished by a device, method, array and use of a device for optical coupling comprising first and second optical waveguides extending longitudinally with cores adapted to guide optical radiation, first resonator means, laterally surrounding the first waveguide, comprising first and second resonator members, and second resonator means, laterally surrounding the second waveguide, comprising third and fourth resonator members, characterised in that first and second deflector means, adapted to couple radiation propagating in the respective first and second waveguides with common radiation modes, which modes are defined by adjustable geometrical and material properties of the device, so as to obtain wavelength selective coupling of radiation guided by the first and second waveguides, provided the resonator means are tuned to the same resonance wavelength.

The present invention is directed to an optical device capable of coupling light propagating in a bound mode in one waveguide to another bound mode of a parallel waveguide. As the coupling is performed only for selected wavelengths, this devices is ideally used as an optical add/drop multiplexer in communication networks utilising fiber optic wavelength division multiplexing.

The wavelength selective optical coupler, described in this invention, comprises two essentially parallel waveguide structures. In each waveguide structure there is a deflector structure manufactured in the light guiding structure of the waveguide. Each waveguide structure is surrounded by an external resonator. In between the two external resonators, there could be arranged one or more internal resonators.

The internal resonators could be a requirement for the constructional practice for the implementation of the present invention. It is however important, that light transmitted through these internal resonators does not perceive any transmission resonances for the wavelength range of interest, as at the transmission resonances due to this internal resonator will provide narrow wavelength regions with a very strong coupling between the waveguides. The best way of preventing these transmission resonances is to make the internal resonators thin, so that the free spectral range of the internal resonators is larger than the wavelength range of interest, and to design the transmission wavelength resonances to surround the wavelength area of interest.

The functionality of the two waveguide structures is to guide light along the waveguides in bound modes. The transverse, i.e. the direction which is orthogonal to the propagation direction, spatial distribution of the bound modes is mainly determined by each of the waveguide structures and the light distribution should be designed to be localized to the region of the waveguide cores. Thus, in regions where there are no deflection structures in the waveguides, light will propagate without losses and without any coupling between the waveguides.

The deflection structures in the waveguides are used for coupling light between the bound modes and the radiation modes of the total waveguide structure. Light will be efficiently coupled between the bound modes and the radiation modes, if the coupling process is phase matched both along the main propagation direction, defined by the parallel waveguides, and in the transverse direction, the direction within the plane defined by the parallel waveguides and orthogonal to the propagation direction.

The transverse spatial distribution of the radiation modes is determined by the whole device structure, comprising both the waveguide structures and the different surrounding resonators. At certain wavelengths there will be radiation modes that are resonant with at least one of the external resonator. At these wavelengths, the resonant radiation modes will mainly be localized to the corresponding resonant external resonator. If the resonant resonator is surrounding a waveguide with a grating and the coupling process between the radiation mode and the guided mode is phase matched, there will be a strong coupling in that resonator between the bound mode and the resonant radiation mode. Thus, the external resonators are used for controlling at what wavelengths there should be strong coupling between the guided and the radiation modes.

To couple light at a certain wavelength from a bound mode of one of the waveguides to another bound mode at the other waveguide, the two external resonators, surrounding each of the waveguides, should be resonant. If both external resonators are resonant at the specific wavelength, and for external resonators with optimized mirror reflectivities all light will couple over between the waveguides. Thus, the invention functions like an ideal wavelength selective coupler. As it is possible to adjust the separation between the mirrors of each of the external cavities, the wavelength for efficient coupling can be tuned.

If none of the external resonators are resonant or if only one of the external resonators is resonant, the coupling between the waveguides at the specific wavelength will be very small. Thus, loss due to coupling, i.e. cross-talk, will be minimal for wavelengths that are not resonant to both of the two external resonators surrounding each of the waveguides. An implication of this property is that many devices can be cascaded without building up large transmission loss or large cross-talk.

When changing the coupling wavelength for the device, it is very important that losses or cross-talk are not incurred on wavelength channels that are not going to be coupled. This is called hit-less tuning. With the present invention, this can be accomplished by first tuning one of the external resonators to the new coupling wavelength and then tuning the second external resonator. By means of this method, the two external resonators are only simultaneously resonant at the start wavelength and at the stop wavelength, whereas they are not simultaneously resonant to the wavelengths in between. Thus, hit-less tuning can be achieved with this invention.

In order to farther described the present invention, and in particular the related coupling process, reference is made to A. Yariv, Optical Electronics, 3rd ed. (CBS College Publishing, New York, USA, 1985) p. 437. Reference is made since the functionality of the present invention is comparable to that of a directional coupler. However, in a directional coupler, coupling between waveguides occurs due to beating between light launched into two bound modes of the directional coupler waveguide structure, whereas for the present invention the coupling between waveguides occurs in a series of mode-coupling processes; from a bound mode in one waveguide to a radiation mode and then finally to a bound mode in the other waveguide. The advantages of the more developed coupling process of the present invention, however, are that the coupling occurs with much improved wavelength resolution and that the device size can be made smaller, as in the present invention the interaction length along the propagation direction is short and there is no requirement of space-consuming regions where the separation between the waveguides is adiabatically changed.

BRIEF DESCRIPTION OF THE DRAWINGS

The features, objects, and further advantages of this invention will become apparent by reading this description in conjunction with the accompanying drawings, in which like reference numerals refer to like elements and in which.

DETAILED DESCRIPTION

The following description is of the best mode presently contemplated for practising the invention. The description is not to be taken in a limiting sense, but is made merely for the purpose of describing the general principles of the invention. The scope of the invention should be ascertained with reference to the issued claims.

Figure 1:
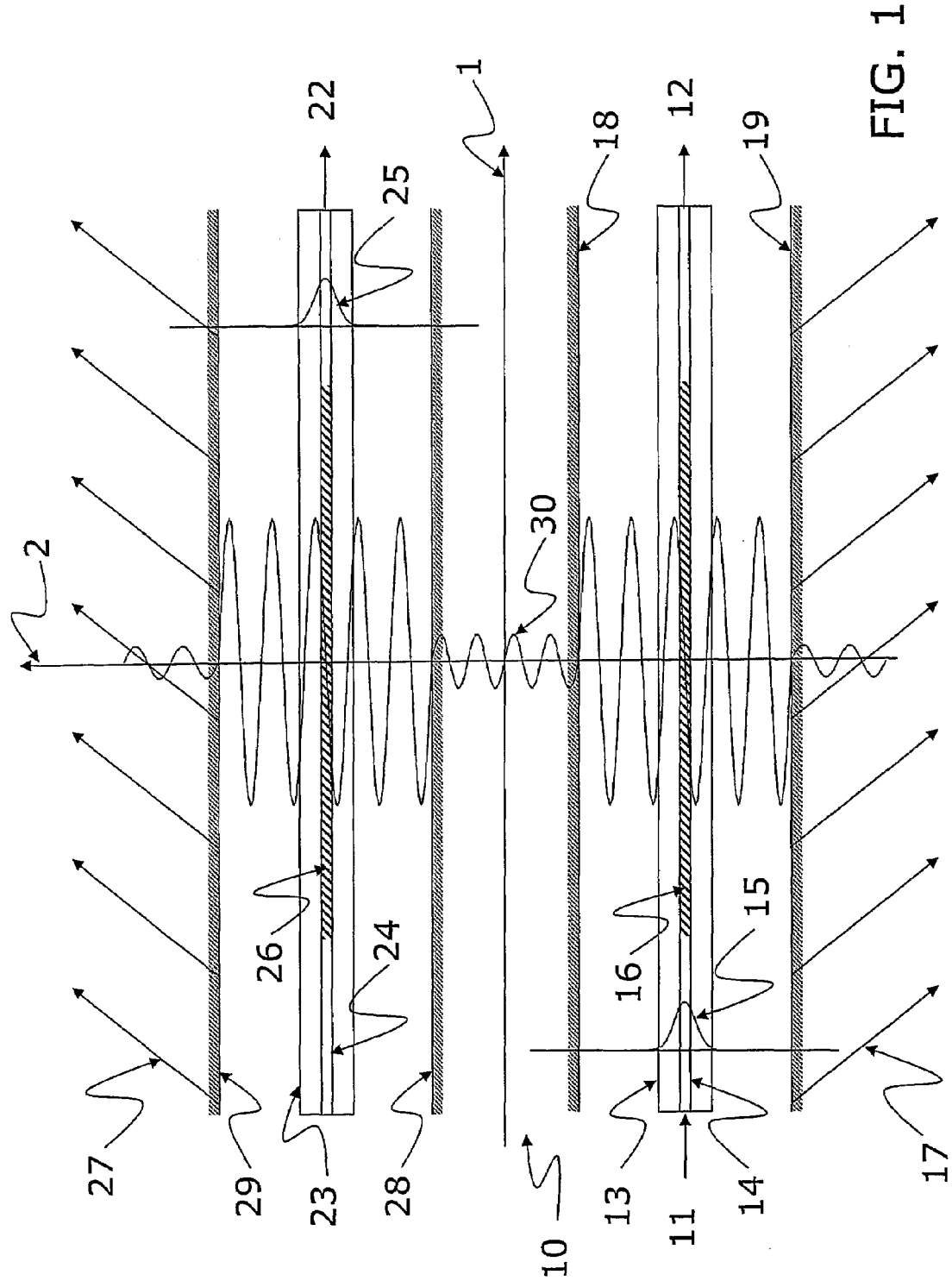
FIG. 1 shows a cross-sectional view of the present invention, including the waveguides with the deflector regions and the external cavities.

The functionality of the present invention is that of a wavelength selective coupler. Light of a certain wavelength, denoted 11 in FIG. 1, is launched into one of the waveguides, 13. By controlling the positions of the mirrors 18, 19 and 28, 29 of the external resonators, light is split up between the two waveguides. The output light signals have reference numerals 12, 22. Thus, for some cavity configurations all light at that particular wavelength can be coupled over to waveguide 23, whereas for other cavity configurations almost all light at this particular wavelength will pass the device undisturbed and exit in the same waveguide as it entered. The same principle applies for light launched into the second waveguide 23. Light at a certain wavelength, launched into the waveguide 23, can exit the device from any of the waveguides 13, 23. The exact power exiting from the two waveguides is again determined by the cavity mirror positions. As the invention operates in a liner optical regime, the superposition principle states that light can be launched simultaneously into both waveguides, and, thus, operate as a wavelength-selective crossbar switch or in other terms as an optical add/drop multiplexer for wavelength-division multiplexing fiber optical networks. In the following, preferred embodiments and the functionality will be described in more detail.

The present invention comprises the mentioned two optical waveguides 13, 23, aligned in parallel with the longitudinal optical axis 1 of the system, each surrounded by an external resonator, defined by mirrors 18, 19 and 28, 29. Each waveguide consists of a core region 14, 24 with a higher refractive index that the surrounding material in the waveguide. Thereby the light is guided along a predetermined path, defined by the optical waveguide structure. In the preferred embodiment, the waveguide is an optical fiber. However, the present invention also applies to planar waveguide structures.

In each waveguide there is a deflector region 16, 26 which is depicted in FIG. 1. In a preferred embodiment, the deflector region consists of a fiber Bragg grating. To provide for maximum outcoupling in a direction approximately orthogonal to the propagation direction for the bound modes, the fringes of the fiber Bragg grating are tilted with an angle between the waveguide propagation direction and the normal to the fringes of approximately 45 degrees. However, the exact outcoupling angle, θ, is determined by a grating equation:

$$nd(1-\sin(\theta))=m\lambda$$

where n is the effective refractive index in the waveguide, d is the distance between the fringes parallel to the longitudinal optical axis of the waveguide, m is an integer, and λ is the vacuum wavelength. The outcoupling angle θ is counted positive if the outcoupled wave has a propagation component in the propagating direction of the incoming wave in the waveguide.

As previously stated, in a preferred embodiment of the invention, the deflector region is defined by a fiber Bragg grating inscribed in the waveguide structure. The extension of the deflector region does not necessarily need to be the same as the core region of the optical fiber, as it is determined by the extension of the UV-illuminated volume of the photosensitive region of the waveguide. In a planar waveguide, the deflector region could be defined again by UV-illumination of photosensitive material, but it could also be defined by a corrugated interface, parallel to the longitudinal optical axis 1, between two materials of different refractive index. The exact shape of the corrugation is determined by the manufacturing process, and could be for instance sinusoidal, saw-tooth or stepped, while other shapes are not excluded.

The exact outcoupling angle is described by the above grating equation. However, the intensity of the light coupled out in that angle is determined by the exact shape of the grating.

The mirrors of the external resonators 18, 19 and 28, 29 for respective waveguide are oriented with their normals essentially parallel to the transverse optical axis 2. However, for reasons of changing the wavelength-selectivity of the device, the mirrors could be oriented with a slight tilt, such that the mirror distances 18 to 19 and 28 to 29 respectively, are not the same at the input of the waveguide structure as at the output of the waveguide structure.

The operation of the present invention will be described in the following. The two waveguides 13, 23 are designed such that they can accommodate at least one guided mode each. The intensity distributions of the guided modes 15, 25 are depicted in FIG. 1. The whole waveguide and cavity structure defines the transverse spatial distribution of the radiation modes, and the real part of the electric field distribution of one of these radiation modes is denoted 30 in FIG. 1. If the optical path length for a complete roundtrip in any of the cavities is an integer number of wavelengths, the amplitude of the field distribution will be large in that cavity, and the cavity is said to be resonant to that wavelength. In the example of the radiation mode with reference numeral 30 in FIG. 1, that radiation mode is resonant to the two external cavities, surrounding each waveguide, but not resonant to the internal cavity formed in between the two external cavities. If the outer mirrors 19, 29 are fully reflecting, there will be a discrete spectrum of radiation modes. Otherwise there will be a continuous spectrum of radiation modes. In FIG. 1 is schematically drawn a radiation mode for a structure not having fully reflecting outer mirrors, and, thus, having radiation modes extending in the regions above the upper external resonator and below the lower external resonator.

As light guided by a waveguide 13, 23 reaches the deflector region 16, 26, some of it scatters into radiation modes 30. The efficiency of the coupling between the guided mode and the radiation mode depends on the phase matching in both the direction of the longitudinal optical axis 1 and the direction of the transverse optical axis 2. When determining the phase matching along the transverse optical axis, the overlap between the mode function for the guided mode and for the radiation mode is also considered. Thus, if the radiation mode is resonant with the external cavity, its amplitude is large and, thus, the overlap and the coupling can be large. On the other hand, if the radiation mode is not resonant with the external cavity, the coupling with the guided mode of the waveguide in the corresponding external cavity is small.

To couple light from a bound mode in one waveguide, such as that having the reference numeral 13, to a bound mode in the other waveguide, such as 23, the external cavities for both waveguides should be resonant. Under these resonant conditions and if the mirror reflectivities are optimally chosen, all light will couple over from the first waveguide to the second waveguide. If none of the external cavities are resonant or if only one of the cavities are resonant, then only a very small amount of light will couple from one waveguide to the other waveguide. Thus, under these non-resonant conditions, the transmission loss due to over-coupling is very low.

Due to the requirement of phase-matching for efficient coupling between the radiation modes and the guided modes, and vice versa, light that is coupled out from the waveguide to a radiation mode, is always coupled back to a guided mode propagating in the forward-direction. Thus, there will be a very small amount of light in bound modes being reflected at the input side, depicted on the left hand side in FIG. 1 of the waveguides. The only exception appears for wavelengths coupling orthogonally out from the waveguides. This condition is found from the grating equation above to appear when the fringe distance d takes a value of a multiple times the material wavelength.

For optimum coupling to appear between the waveguides, the outer cavity mirrors 19, 29 should be fully, i.e. 100%, reflecting and the reflectivities of the inner cavity mirrors 18, 28 should be take a value of $1-R_s$, where $R_s$, is the effective reflectivity for each of the deflector regions.

For deviations from these optimal mirror reflectivities, the intentional over-coupling of light between the waveguides will be reduced. For outer cavity mirror reflectivities smaller than 100%, light will also be lost by transmission through the outer mirrors 19, 29. The exact amount of light lost through these mirrors depends on the finesse of the cavity and the outer cavity mirror reflectivities. Under conditions when the outer cavity mirror 19, 29 reflectivities are less than 100%, the optimization of the inner cavity mirror 18, 28 becomes more complicated and will be determined by the particular application specifications.

In between the two external resonators there could be one or more internal resonators. This internal resonator structure is defined by the all layers and mirrors between the inner mirrors 18, 28 of the external resonators, such that the mirrors 18, 28 form the outer mirrors surrounding the internal resonator. As mentioned above, the internal resonators could be a requirement for the constructional practice for implementing this invention. It is important, however, that light transmitted through these internal resonators does not perceive any transmission resonances due to the internal resonator for the wavelength range of interest, as at the transmission resonances there will be narrow wavelength regions with a strong coupling between the waveguides. The best way of preventing these transmission resonances is to make the internal resonators thin, so that the free spectral range of the internal resonators is larger than the wavelength range of interest, and to design the transmission wavelength resonances to surround the wavelength area of interest.

If the constructional practice requires a piece of material between the external cavities, i.e. the layer structure between the mirrors 18, 28 in FIG. 1, it possible to replace either of the mirrors 18, 28 with an anti-reflection coating. Thereby there will only be two cavities, now with a common separating mirror. The cavity including the anti-reflection coating and, thus, the extra piece of material will now probably be thicker than the other cavity and, thus, have a smaller free spectral range. Adjustments that effect the spectral performance is to be accounted for when evaluating this anti-reflection coating embodiment for a particular application.

Figure 2:
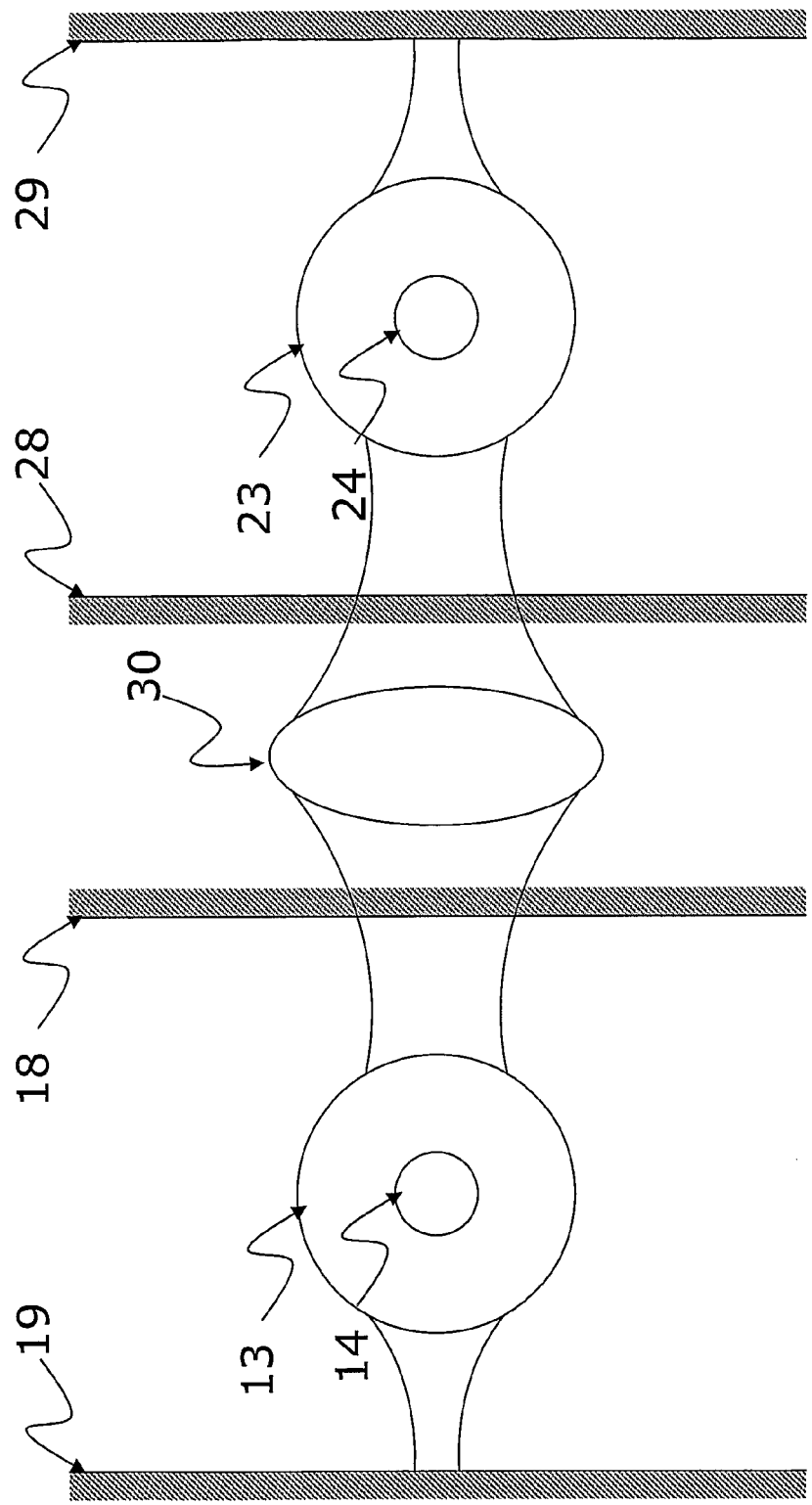
FIG. 2 shows a transverse cross-sectional view of the present invention, including optical fiber waveguides and a cylindrical lens for reducing the transverse beam divergence.

FIG. 2 shows a transverse cross-section of this invention, where a cylindrical lens, 30, located in the internal resonator is used for compensation of beam divergence due to diffraction. In this embodiment, with optical fibers, the optical fibers will also act as focusing elements in the beam path. In FIG. 2 a conventional lens was drawn, but similar functionality could also be obtained using a Fresnel lens or other diffractive or refractive micro-optical elements.

Figure 3:
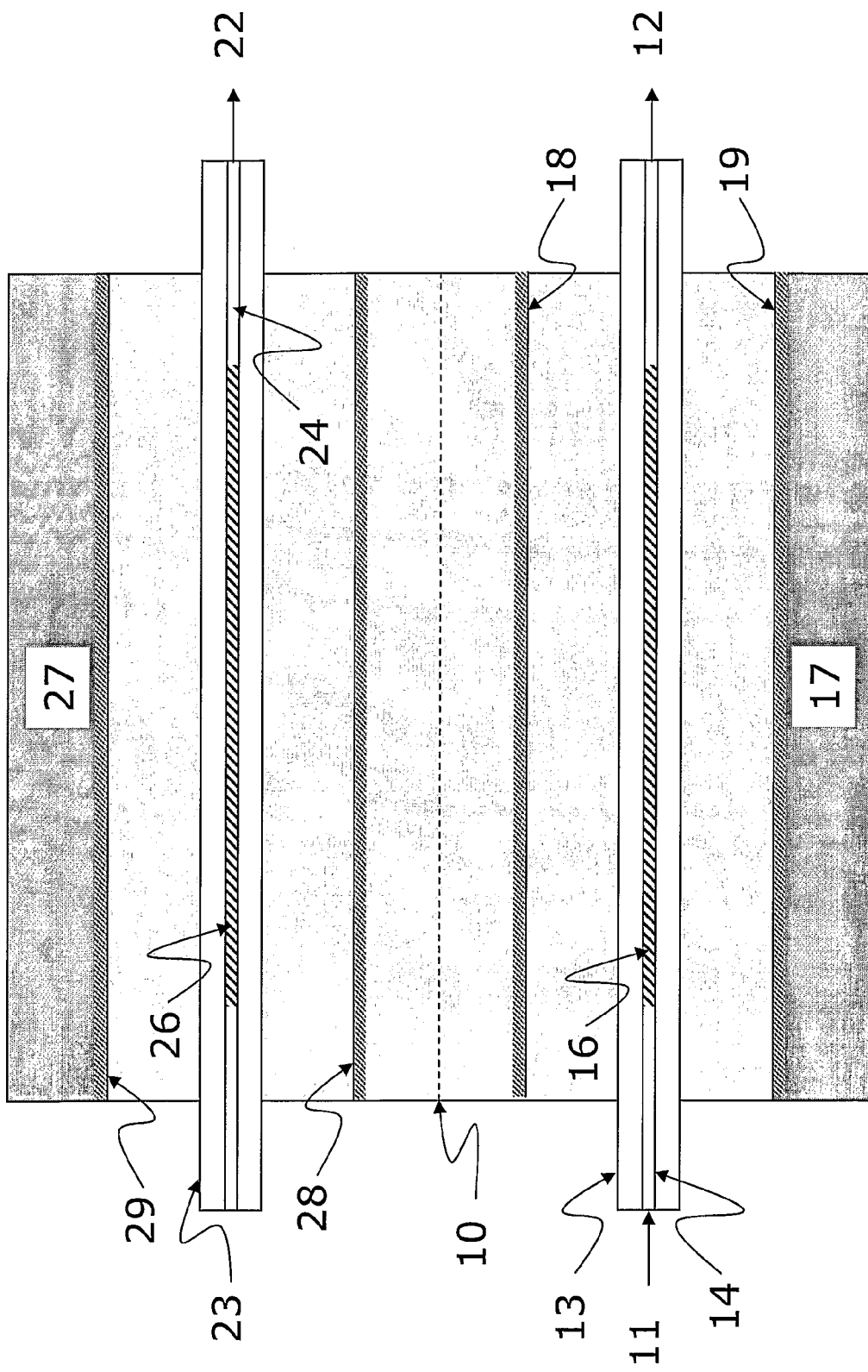
FIG. 3 shows a first embodiment of the present invention, including actuators for tuning of the mirror positions.

FIG. 3 shows a drawing of an alternative embodiment of the present invention, in which actuators 17, 27 are used for controlling the distances between the mirrors in the external resonators. Specifically is meant the distance between mirrors 18 and 19 and the distance between mirrors 28 and 29. Using this mechanical actuation, the wavelength for which coupling occurs between the waveguides can be controlled. In this embodiment, mechanical mirror actuation is disclosed, but the tuning of the optical path length in the external cavities can also be performed by changing the refractive index of the materials in the external resonators.

A second feature of this embodiment is that the coupled cavity structure can be manufactured by sandwiching two identical or similar single cavity structures. Here the structure between mirror 19 and the dashed line 10 represent one cavity and the structure between the dashed line 10 and the mirror 29 represent the other cavity.

Figure 4:
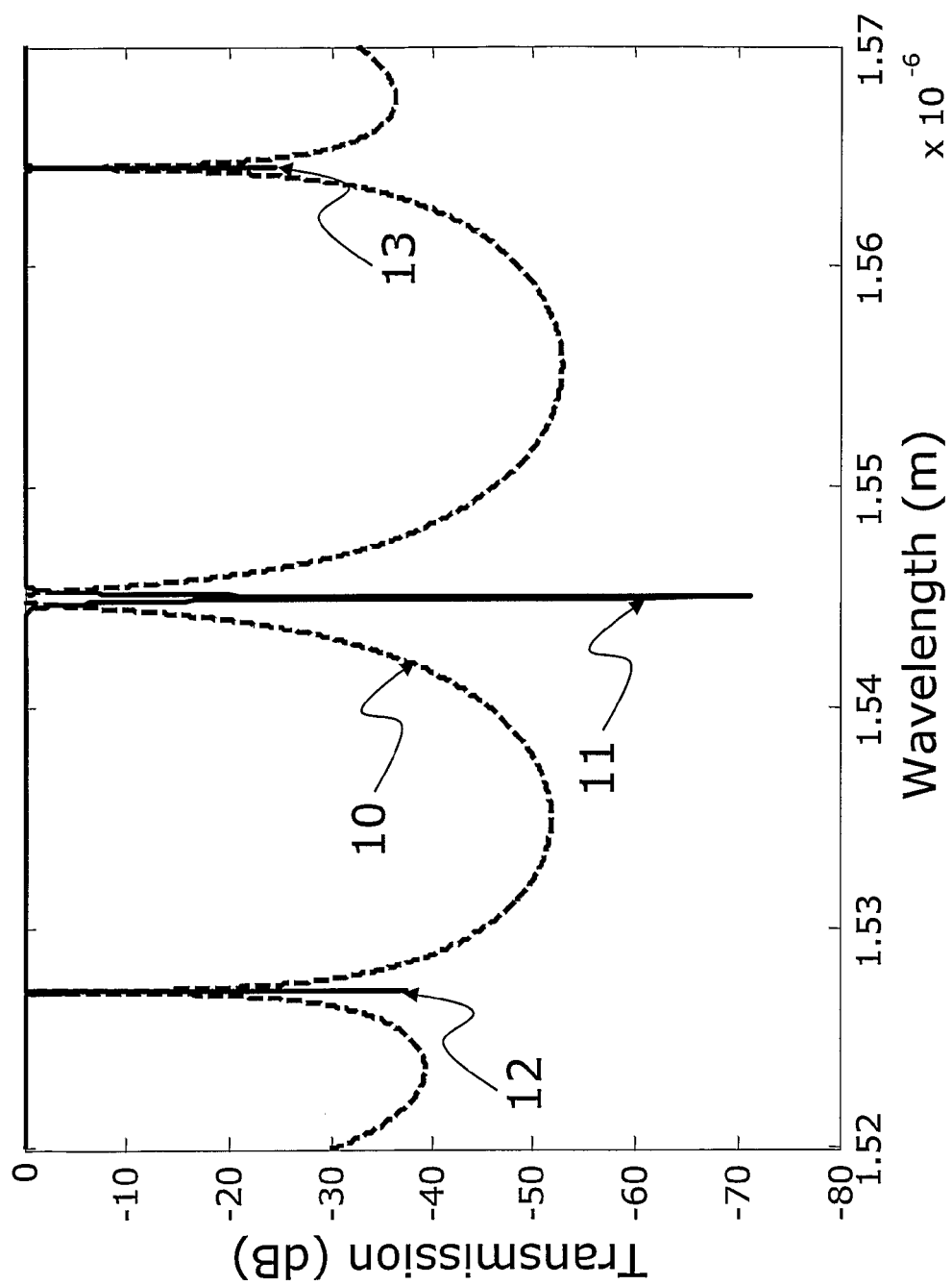
FIG. 4 shows a graph of the light transmitted, according to the embodiment in FIG. 3, when the free spectral range of the external cavities exceeds the wavelength range of interest.

FIG. 4 shows the transmission (solid line) and coupling (dashed line) spectra for device embodiment where the outer mirrors 19, 29 and depicted in FIG. 3 are fully reflecting. For this particular example, light couples over between the waveguides for a wavelength of 1,545 μm. At this wavelength, the coupling between the waveguides is 100% (0 dB) whereas the transmission is 0 (−∞dB). Thus, for this wavelength the invention operates as an ideal coupler. The transmission dips denoted 12 and 13, respectively, are due to that the internal cavity is resonant for those wavelengths. As shown in the graph, the transmission at those wavelengths is low (close to −40 dB). Thus, it is important that those transmission resonances are designed such that they do not appear within the wavelength region of interest. In this case, a useful wavelength region can be found approximately within the range of 1,53 and 1,56 μm. If the device should work as an ideal wavelength-selective coupler, it is also important that there are no resonances due to the external resonators within the wavelength region of interest. Thus, to accomplish that, the free spectral range also for the external resonator should be larger than the wavelength range of interest. This puts a restriction on the maximum distance between the mirrors of each external resonator. For the example in FIG. 4, no more resonances due to the external resonators appear than the one at 1,545 μm.

The requirement to have large enough free spectral range for the external cavities, imposes restrictions on the maximum thickness of the optical waveguides. For some types of waveguides, it could be difficult to make them thin enough to accommodate for a large enough free spectral range. However, another embodiment according to the invention and applicable for such waveguides, is to have wider external cavities, but with different optical cavity thicknesses for the two external resonators. In this embodiment, coupling only occurs for wavelengths that simultaneously equal two times the cavity thickness divided by an integer. That is:

$$\lambda = \frac{2L_1}{m} = \frac{2L_2}{n}$$

where $\lambda$ is the resonant vacuum wavelength, $L_1$ and $L_2$ are the optical thicknesses, i.e. the product of the refractive index and the geometrical thickness, and m and n are two arbitrary integers. Based on this Vernier principle it is now possible to design the cavity thicknesses such that only one wavelength is resonant for both cavities for the wavelength range of interest, even though each cavity can have many resonances within the wavelength range of interest. Another advantage of using the Vernier principle is that the tuning range for the optical thickness is smaller in this case, as for each external resonator there could be many different resonance orders, which is realised by means of the different values of m and n in the equation above, within the wavelength range of interest. Thus, to provide coupling at a certain wavelength, it is only necessary to tune the closest resonance order of each resonator to the specified coupling wavelength.

Figure 5:
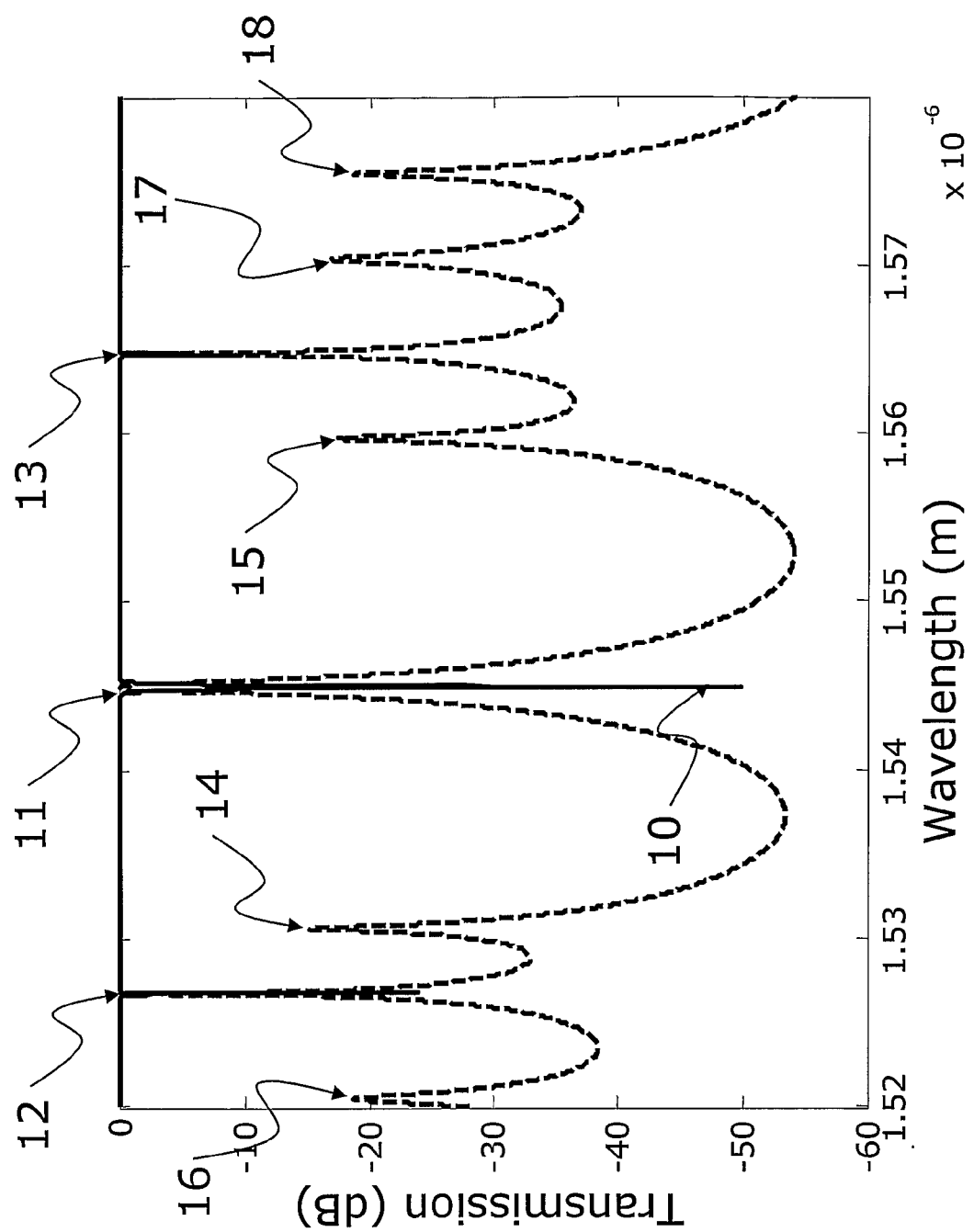
FIG. 5 shows a graph of the light transmitted according to the embodiment in FIG. 3, when the free spectral range of the cavities surrounding the waveguides is smaller than the wavelength range of interest.

FIG. 5 shows transmission spectrum (solid line) and coupling spectrum (dashed line) for the embodiment having wider external cavities of different thickness. As in FIG. 4 the resonance wavelength common to both cavities is selected to be 1,545 μm, and shows the transmission dip 10 and the coupling peak 11. In the spectra, the peaks 12, 13 are recognized due to resonances of the internal resonator. Furthermore, the coupling peaks 14, 15, 18 are due to resonances in one of the cavities, whereas the coupling peaks 16, 17 are due to resonances of the other cavity. It should be noticed that even though the transmission is high, the coupling at the peaks 14, 15 could be too high for some coupler applications. However, if the coupler device is only used as a two-port attenuator, the coupling peaks 14, 15 are of no relevance.

An important property of a wavelength-selective coupler is the filter function of the device. That is, what wavelengths around a center wavelength that will provide sufficient coupling between the waveguides. A system requirement is often that the filter function should have a top-hat shape, with sharp edges surrounding a wavelength region with more or less uniform transmission/coupling properties. To obtain the sharp edges of the filter, it is required that the finesse of the cavity is high, which implies that the mirror losses and all other losses should be very low. To provide a wavelength region with uniform transmission/coupling properties between the sharp edges, the external cavity mirrors could be aligned to provide a slight wedge along the longitudinal optical axis. Thereby there will be slightly different cavity thicknesses along the waveguide, which broadens the spectral profile. An alternative embodiment to obtain a broadened spectral profile is to manufacture the grating with a slight chirp of the grating period. Thereby light will couple out in slightly different angles along the waveguide, and, thus, experience slightly different resonance wavelengths along the waveguide.

Figure 6:
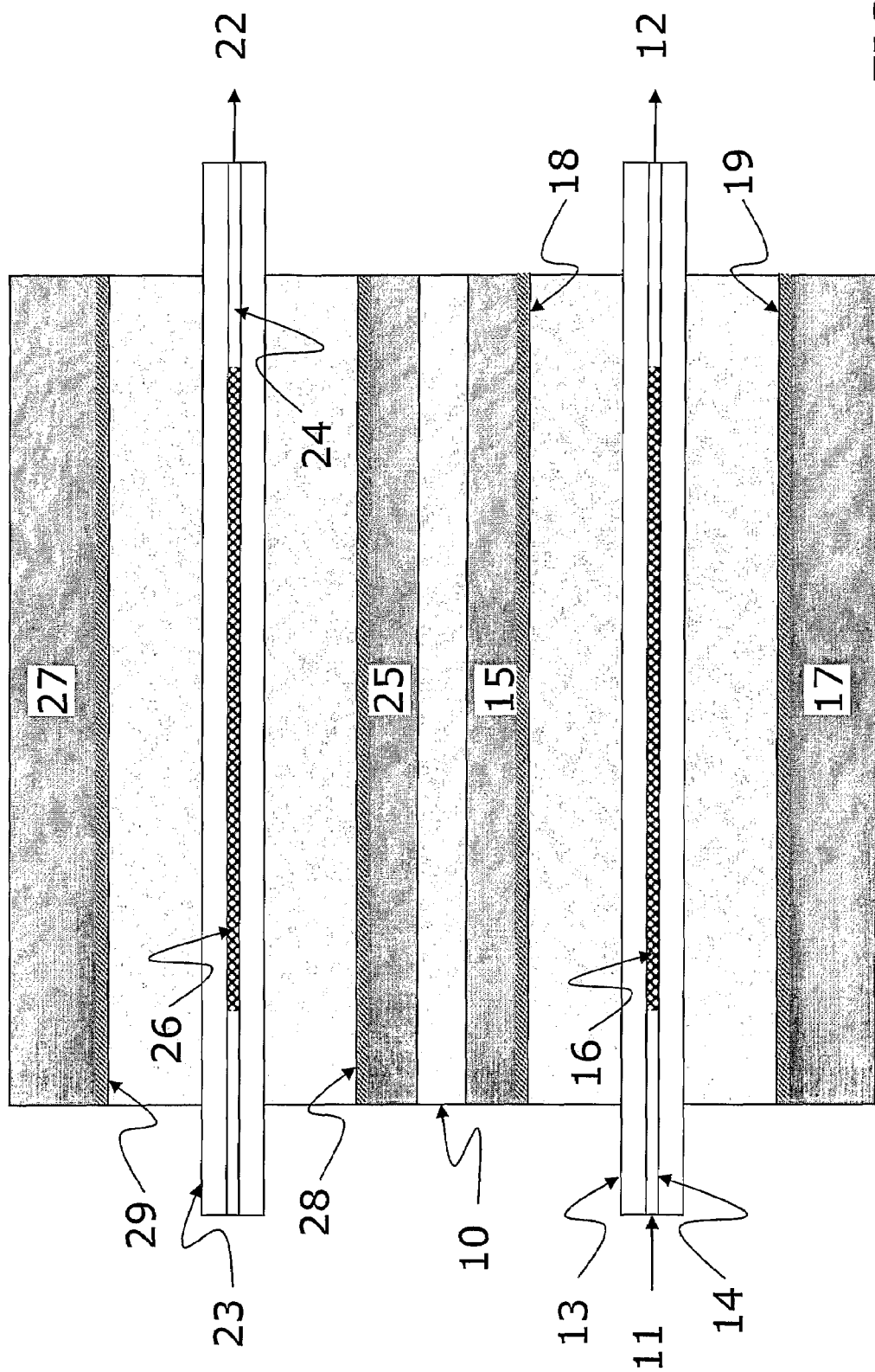
FIG. 6 shows an embodiment of the present invention, including crossed gratings in the deflector region.

FIG. 6 shows yet an alternative embodiment of the present invention, where the deflector regions consist of superposed crossed tilted gratings. The idea with these crossed gratings is that light is coupled out both upwards and downwards from these gratings. Thus, light that couples upwards from the waveguide will interfere with light that couples out downwards from the waveguide and that subsequently reflects upwards again. Depending on the phase difference between these two waves, they could interfere constructively or destructively. If the two superposed tilted gratings are of equal strength and if the two outcoupled waves interfere destructively, there will be no resulting field in the external cavity. Thus, in addition to wavelength tuning, the coupling between the waveguides can be controlled by tuning the position of the waveguide between its surrounding mirrors. To accomplish hitless tuning with these crossed gratings, the waveguide is first tuned to a position such that the outcoupled waves will interfere destructively. Then the optical thickness of the cavity is tuned from the initial resonance wavelength to the final resonance wavelength, all the time keeping the waveguide in a position giving destructive interference for the outcoupled waves. At the final cavity thickness, the waveguide is tuned to a position such that the outcoupled waves interfere constructively. Notice that to be able to tune both the cavity thickness and the waveguide position within the cavity, it is required that either both mirrors of each cavity can are moveable or that one mirror and the waveguide of each cavity can be moved. For the embodiment in FIG. 6, all mirrors have actuators 15, 17 and 25, 27 respectively.

Figure 7:
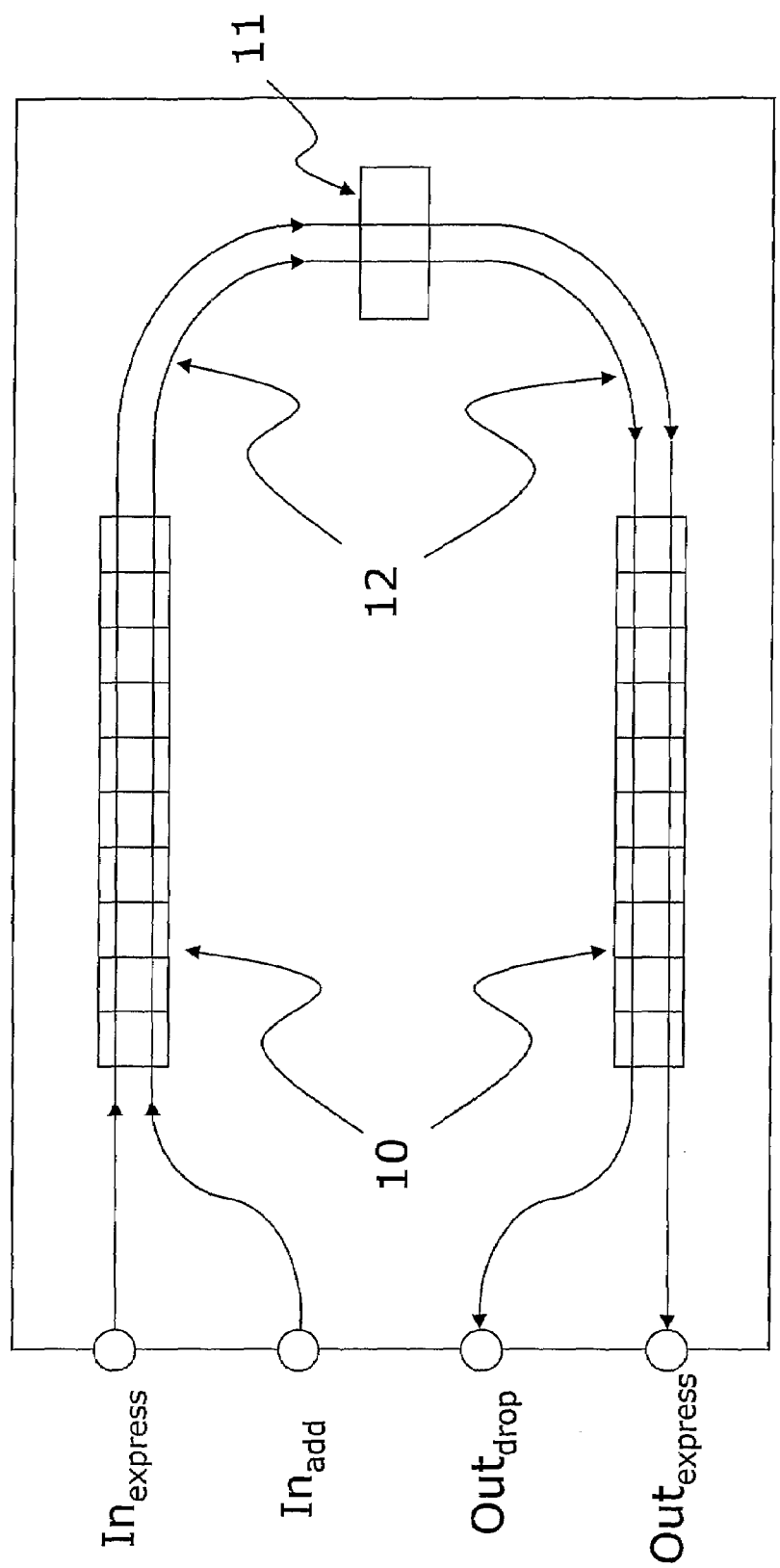
FIG. 7 shows an embodiment of a polarization-independent optical add/drop multiplexer.

The wavelength-selective optical coupler element, described in this invention is highly polarization-dependent. Light polarized orthogonally to the longitudinal and the transverse optical axes with reference numerals 1, 2 in FIG. 1, will couple between the waveguides. Light polarized along the transverse optical axis will not experience any coupling. Thus, to make a wavelength-selective coupler device that operates properly independently of state of polarization of the input light, an embodiment consisting of two arrays 10 of wavelength-selective coupler elements is shown in FIG. 7. In this embodiment, each element in the array is tuned to couple a certain wavelength between the waveguides. The upper array couples the component of the polarization aligned orthogonally to the longitudinal and transverse optical axis. The polarization component aligned with the transverse optical axis propagates through the upper array without any coupling. To keep the polarization state, polarization-maintaining fiber 12 is used to guide the light from the output of the upper array to the polarization twister 11 and from the polarization twister to the lower array. The polarization twister rotates the polarization planes 90 degrees, such that the light that propagated unaffected by the upper array, will now couple for the resonant wavelengths in the lower array, whereas the polarization component that experienced coupling in the upper array will propagate unaffected in the lower array. Thus, having passed through both arrays, all light at resonant wavelengths have coupled between the two waveguides. It will be understood by those of ordinary skill in the art that numerous other embodiments for polarization-independent operation are conceivable within the scope of the invention. Moreover, as shown in FIG. 7, due to the small size and the low loss of each element, a plurality of wavelength-selective couplers can be cascaded after each other.

Figure 8:
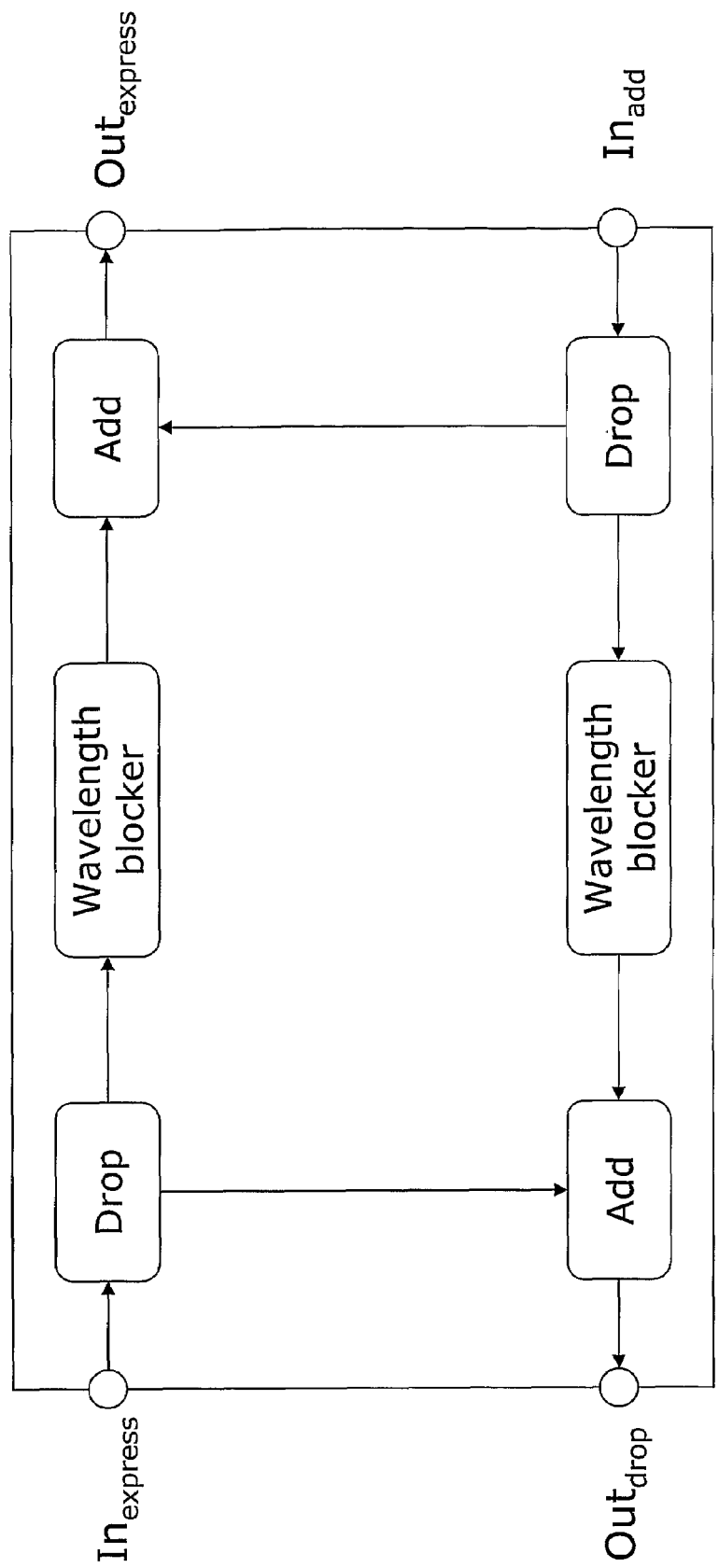
FIG. 8 shows an block diagram of an add/drop multiplexer, including wavelength blocking devices, FIG. 9 schematically depicts an embodiment of an optical add/drop multiplexer, where the individual added/dropped wavelength channels are multiplexed/demultiplexed. In this embodiment a wavelength blocker is used.

To be able to simultaneously couple light signals at the same wavelength from the express waveguide to the drop waveguide and from the add waveguide to the express waveguide, it is important that there is a very small amount of the original light signal left in the waveguide, before light from the other waveguide is coupled into that waveguide. If there is too much of uncoupled light left, there will be coherent cross-talk between the uncoupled and the coupled signals. To increase the attenuation of the signal before adding a new signal, FIG. 8 shows an embodiment with wavelength blockers used between the drop and the add elements. In this embodiment channels are dropped using a drop element and added to the other waveguide using an add element. Before adding new signals to the channel that had been dropped, the remaining signal in the channel must be attenuated. This channel-specific attenuation is made using the wavelength blocker. As mentioned in the discussion concerning FIG. 5, the wavelength-specific attenuator—the wavelength blocker—can also be implemented using the present invention.

Figure 9:
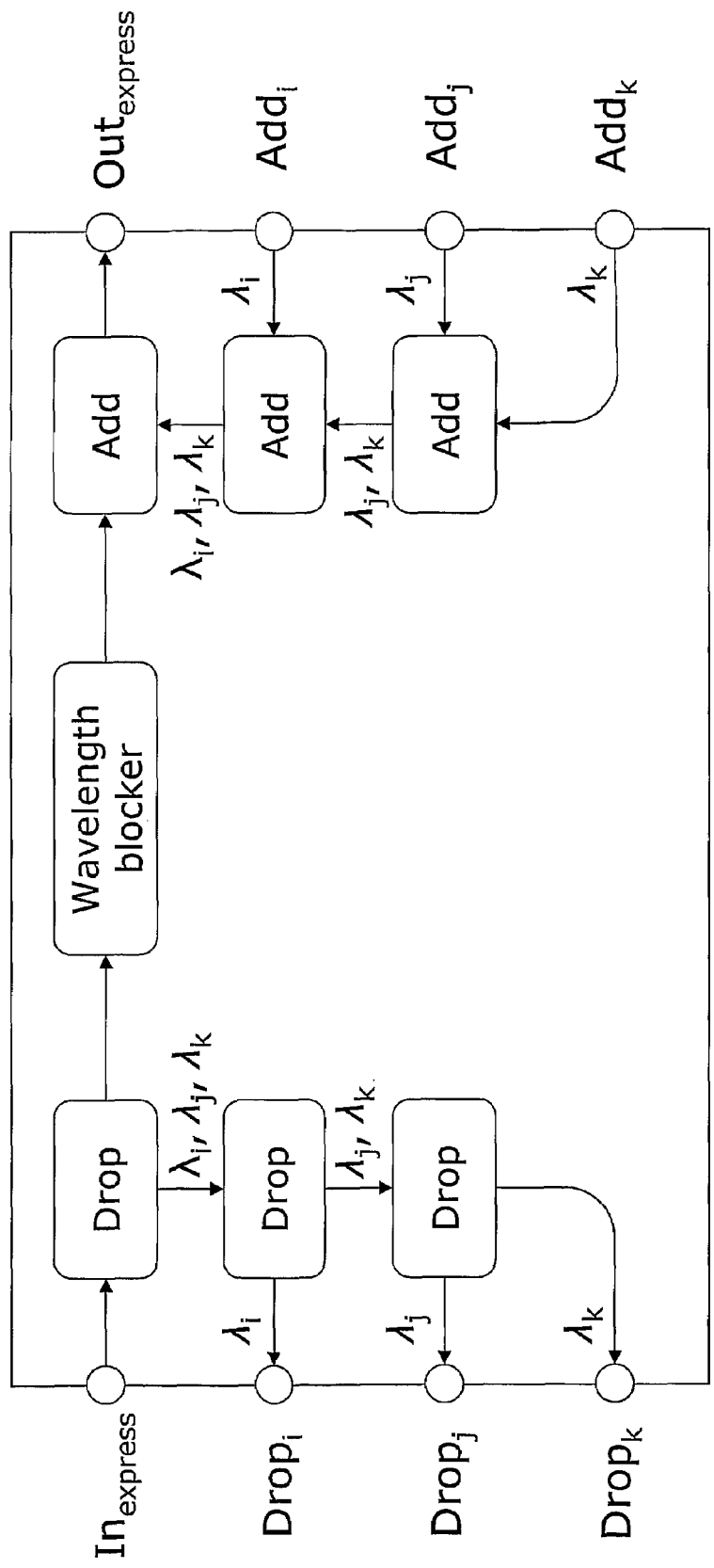

FIG. 9 shows how single channel optical add/drop elements can be used for demultiplexing the dropped signals and multiplexing several channels to be added. The advantage with this multiplexing scheme is that the channels can be reconfigured depending on the network traffic situation. Included in FIG. 9 is also a wavelength blocker for the removal of remaining signals in dropped channels.

Figure 10:
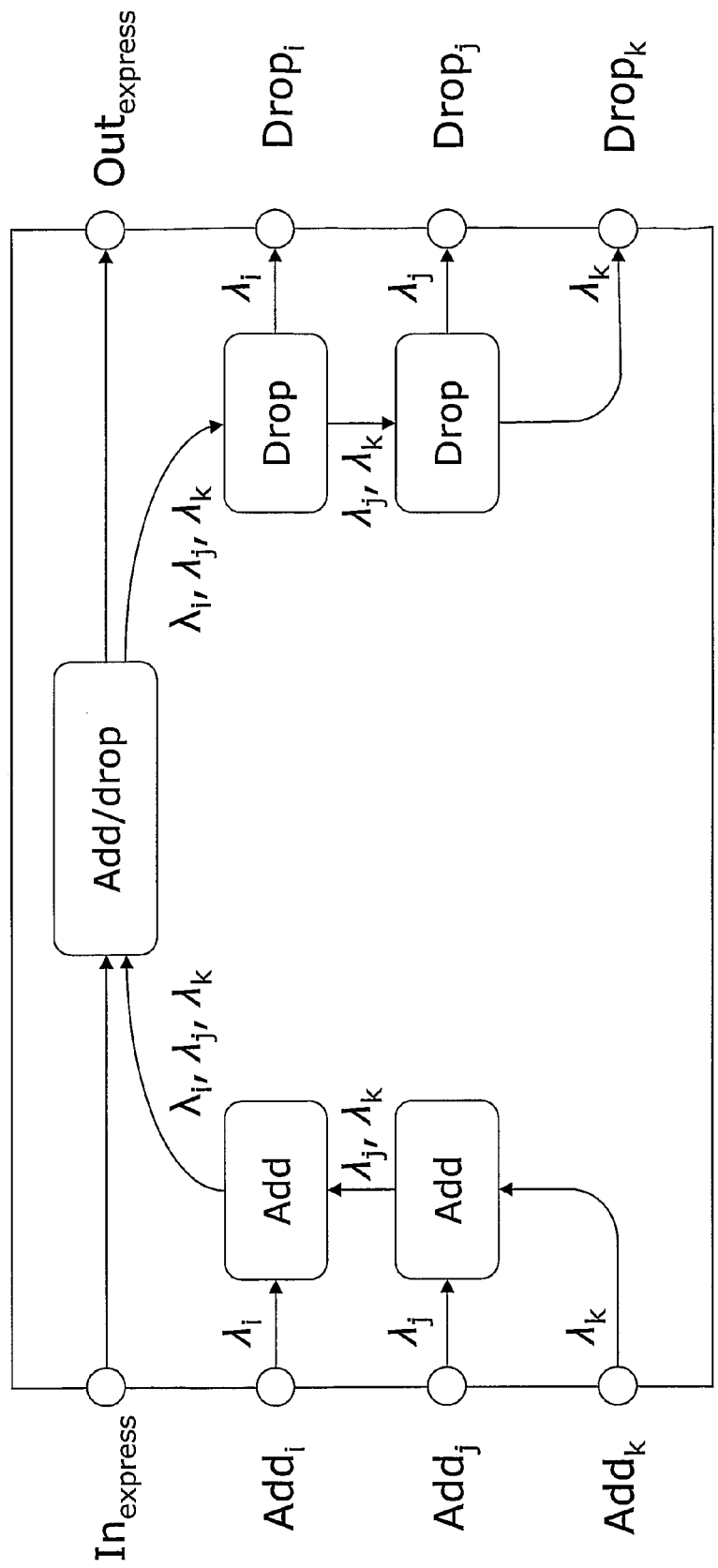
FIG. 10 shows an embodiment of an optical add/drop multiplexer, of similar functionality as the embodiment depicted in FIG. 9, but without a wavelength blocker.

FIG. 10 shows an embodiment of a reconfigurable optical add/drop multiplexer, including reconfigurable (de-)multiplexing of the dropped/added channels. For this embodiment it was assumed that the add/drop functionality (denoted "Add/drop") can be implemented without wavelength blocker.

The invention has been described with the aid of some preferred embodiments as shown on the drawings. Nevertheless, it will be understood by those of ordinary skill in the art that numerous modifications and alterations of the described embodiments, as well as other embodiments, are conceivable within the scope of the invention. The scope of the invention is defined by the claims.

The invention claimed is:

1. A device for optical coupling comprising
   first and second optical waveguides (13, 23) extending longitudinally with cores (14, 24) adapted to guide optical radiation (15),
   first resonator means, laterally surrounding the first waveguide, comprising first and second resonator members (18, 19), and second resonator means, laterally surrounding the second waveguide, comprising third and fourth resonator members (28, 29),
   characterised in that
   first and second deflector means (16, 26), adapted to couple radiation propagating in the respective first and second waveguides with common radiation modes (30), which modes are defined by adjustable geometrical and material properties of the device, so as to obtain wavelength selective coupling of radiation guided by the first and second waveguides, provided the resonator means are tuned to the same resonance wavelength.

2. A device for optical coupling according to claim 1, characterised in that
   at least one of the waveguides comprise optical fibers or planar optical waveguides.

3. A device for optical coupling according to claim 1, characterised in that
   at least one of the deflector means includes a periodic refractive index modulation grating, preferably inscribed in the light-guiding regions of said optical waveguide.

4. A device for optical coupling according to claim 3, characterised in that
   the deflector means includes optical Bragg grating, preferably tilted.

5. A device for optical coupling according to claim 3, characterised in that
   the respective deflector means include two superposed Bragg gratings, having essentially orthogonal grating vectors.

6. A device for optical coupling according to claim 5, characterised in that
   the superposed gratings are adapted to deflect light in the same longitudinal direction but in opposite transverse directions and simultaneously collect light arriving from the same longitudinal direction but from opposite transverse directions.

7. A device for optical coupling according claim 5, characterised in that
   interference between waves coupled out from each of the gratings is controllable by adjusting the geometrical position or refractive index of any of the waveguides the resonator means.

8. A device for optical coupling according to claim 3, characterised in that
   the deflector means includes transversally asymmetric optical Bragg grating.

9. A device for optical coupling according to claim 1, characterised in that
   comprised optical elements, such as the resonator means, the optical waveguides and the deflector means are arranged to have mirror symmetry with respect to a plane defined by the longitudinal and transverse optical axes (1, 2).

10. A device for optical coupling according to claim 1, characterised in that
    at least one of the resonator members is a mirror chosen from a group consisting of:

dielectric multilayer mirror, metal mirror and metal mirror with dielectric coating.

11. A device for optical coupling according to claim 1, characterised in that
a separation between the first second resonator means provides an internal resonator means, and
the separation is selected to locate the internal resonator resonance at wavelengths outside the range in which the resonator means are made resonant.

12. A device for optical coupling according to claim 1, characterised in that
the resonance wavelength of each of the resonator means is controllable by adjusting the optical distance, the product of the geometrical distance and refractive index, between the first and second resonator members and the third and fourth resonator members, respectively.

13. A device for optical coupling according claim 12, characterised in that
the refractive index is controllable by adjusting at least one parameter chosen from a group consisting of: temperature, injection of charge carriers, application of an electric voltage and application of mechanical stress.

14. A device for optical coupling according to claim 1, characterised in that
the resonator means are made resonant to radiation having a wavelength within the range of 1,260 to 1,675 µm.

15. A device for optical coupling according to claim 1, characterised in that
the resonator means are made resonant to radiation having a wavelength within anyone of the ranges of: 1,260 to 1,360 µm (O-band), 1,360 to 1,460 µm (E-band), 1,460 to 1,530 µm (S-band), 1,530 to 1,565 µm (C-band), 1,565 to 1,625 µm (L-band) or 1,625 to 1,675 µm (U-band).

16. A device for optical coupling according to claim 1, characterised in that
at least one of the deflector means includes a grating comprising blazed corrugations having alternating projections and spaces along a wall parallel to the longitudinal axis of the respective waveguides.

17. A device for optical coupling according to claim 1, characterised in that
the spectral selectivity is controllable by changing mirror separation along the longitudinal optical axis for the first and second resonator means, or by having a chirped grating period in the first and second deflector means.

18. A device for optical coupling according to claim 1, characterised in that
beam transformation means is arranged between the resonator means to reduce transverse beam divergence, whereby the means is chosen from a group comprising: a conventional, preferably cylindrical, lens, a Fresnel lens, a refractive or diffractive optical element.

19. A device for optical coupling according to claim 1, characterised in that
each of the first and said second resonator means has different optical thickness, while being resonant for the same wavelength.

20. A device for optical coupling according to claim 1, characterised in that
the orders of resonance of at least one of the resonator means is adjustable so as to tune the coupling wavelength.

21. An array of devices for optical coupling according to claim 1, characterised in that
each device for optical coupling is adapted to couple any wavelength within a predetermined wavelength range.

22. A method of fabricating a device for optical coupling according to claim 1, characterised by
sandwiching two essentially identical structures, each including an external resonator and an optical waveguide with a deflector.

23. Use of a device for optical coupling according to claim 1 as a two-port spectrally tunable transmission filter.

24. Use of a device for optical coupling according to claim 1 as a two-port spectrally selective attenuator.

* * * * *